(12) United States Patent
Li et al.

(10) Patent No.: US 8,082,137 B2
(45) Date of Patent: Dec. 20, 2011

(54) METHOD AND APPARATUS FOR THERMAL MODELING AND ANALYSIS OF SEMICONDUCTOR CHIP DESIGNS

(75) Inventors: Peng Li, College Station, TX (US); Larry Pileggi, Pittsburgh, PA (US); Mehdi Asheghi, Pittsburgh, PA (US); Rajit Chandra, Cupertino, CA (US)

(73) Assignee: Gradient Design Automation, Inc., Santa Clara, CA (US)

( * ) Notice: Subject to any disclaimer, the term of this patent is extended or adjusted under 35 U.S.C. 154(b) by 800 days.

(21) Appl. No.: 12/137,344

(22) Filed: Jun. 11, 2008

(65) Prior Publication Data

US 2008/0243461 A1 Oct. 2, 2008

Related U.S. Application Data

(63) Continuation of application No. 11/180,353, filed on Jul. 13, 2005, now Pat. No. 7,401,304, which is a continuation-in-part of application No. 11/039,737, filed on Jan. 20, 2005, now Pat. No. 7,203,920, and a continuation-in-part of application No. 10/979,957, filed on Nov. 3, 2004, now Pat. No. 7,194,711.

(60) Provisional application No. 60/587,313, filed on Jul. 13, 2004, provisional application No. 60/599,098, filed on Aug. 5, 2004, provisional application No. 60/539,727, filed on Jan. 28, 2004.

(51) Int. Cl.
*G06F 17/50* (2006.01)
*G06F 11/22* (2006.01)

(52) U.S. Cl. .......................... 703/13; 716/136

(58) Field of Classification Search .................. 703/13, 703/14; 716/1, 4, 5
See application file for complete search history.

(56) References Cited

U.S. PATENT DOCUMENTS

2004/0133408 A1 * 7/2004 Verdyck ........................ 703/2

OTHER PUBLICATIONS

Wang et al. (3-D Thermal-ADI: A Linear-Time Chip Level Transient Thermal Simulator, IEEE Dec. 2002).*

* cited by examiner

*Primary Examiner* — Paul Rodriguez
*Assistant Examiner* — Andre Pierre Louis

(57) ABSTRACT

A method and apparatus for modeling and thermal analysis of semiconductor chip designs is provided. One embodiment of a novel method for performing thermal testing of a semiconductor chip design includes calculating full-chip temperatures over the semiconductor chip design (e.g., to identify steep thermal gradients) and modeling the full-chip temperatures in accordance with a geometric multi-grid technique. The geometric multi-grid technique is tailored to determine temperatures within the semiconductor chip design based at least in part on the physical attributes or geometry of the design.

27 Claims, 13 Drawing Sheets

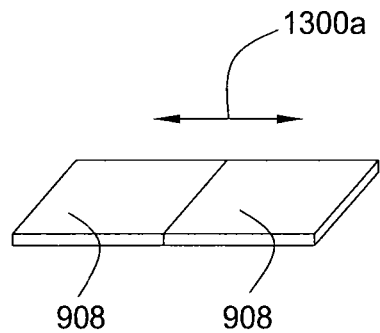 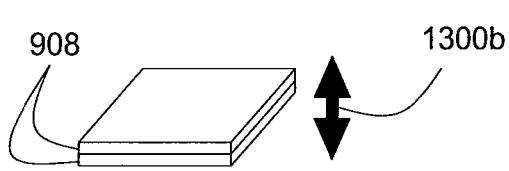
FIG. 13A     FIG. 13B
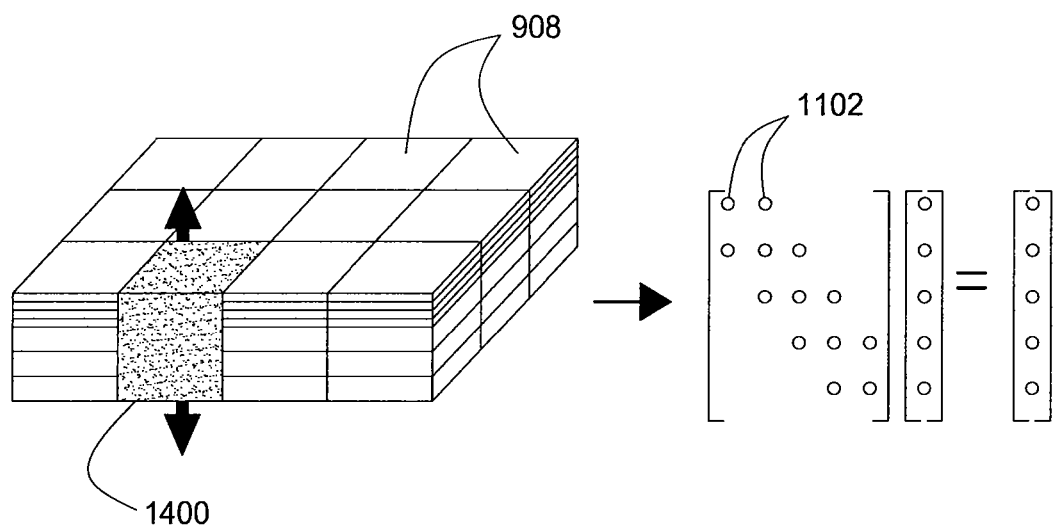
FIG. 14

US 8,082,137 B2

METHOD AND APPARATUS FOR THERMAL MODELING AND ANALYSIS OF SEMICONDUCTOR CHIP DESIGNS

CROSS-REFERENCE TO RELATED APPLICATIONS

This application is a continuation of U.S. patent application Ser. No. 11/180,353, filed Jul. 13, 2005, now U.S. Pat. No. 7,401,301 entitled, METHOD AND APPARATUS FOR THERMAL MODELING AND ANALYSIS OF SEMICONDUCTOR CHIP DESIGN", which claims the benefit of U.S. Provisional Patent Application No. 60/587,313, filed Jul. 13, 2004 entitled "Efficient Full-Chip Thermal Modeling and Analysis", which is herein incorporated by reference in its entirety. In addition, this application is a continuation-in-part of U.S. patent application Ser. No. 11/039,737, filed Jan. 20, 2005, now U.S. Pat. No. 7,203,920 entitled "Method and Apparatus For Retrofitting Semiconductor Chip Performance Analysis Tools With Full-Chip Thermal Analysis Capabilities", hereinafter "the '737 application", which is herein incorporated by reference in its entirety. In turn, the '737 application claims the benefit of U.S. Provisional Patent Application No. 60/599,098, filed Aug. 5, 2004, entitled "Method And Apparatus For Retrofitting Commercial Timing, Delay, Voltage And Power Analysis Tools With Temperature Gradients", which is herein incorporated by reference in its entirety. The '737 application is also a continuation-in-part of U.S. patent application Ser. No. 10/979,957, filed Nov. 3, 2004, now U.S. Pat. No. 7,194,711 entitled "Method And Apparatus For Full-Chip Analysis Of Semiconductor Chip Designs" and claiming priority to U.S. Provisional Patent Application No. 60/539,727, filed Jan. 28, 2004, entitled "Method and Apparatus for Improving Constant Temperature Based Timing Analysis of Integrated Circuits By Using Computed Thermal Gradients", both of which are herein incorporated by reference in their entireties.

FIELD OF THE INVENTION

The present invention generally relates to semiconductor chip design, and more particularly relates to the thermal analysis of semiconductor chip designs.

BACKGROUND OF THE INVENTION

FIG. 1 is a schematic diagram illustrating an exemplary semiconductor chip 100. As illustrated, the semiconductor chip 100 comprises one or more semiconductor devices 102a-102n (hereinafter collectively referred to as "semiconductor devices 102"), such as transistors, resistors, capacitors, diodes and the like deposited upon a substrate 104 and coupled via a plurality of wires or interconnects 106a-106n (hereinafter collectively referred to as "interconnects 106"). Currently available semiconductor devices 102 and interconnects 106 share power, thereby distributing a thermal gradient over the chip 100 that may range from 60 to 140 degrees Celsius in various regions of the chip 100, depending on the application.

Semiconductor chips such as the semiconductor chip 100 typically comprise the bulk of the components in an electronic system. As such, proper thermal analysis is critical to the design of semiconductor chips e.g., to ensure that a chip constructed in accordance with a given design will operate as intended and will not fail in use. The precise thermal gradient generated by dissipated heat from a semiconductor chip is determined by the local temperatures of the semiconductor devices and the interconnects, which vary throughout the semiconductor chip. Accordingly, a thermal analysis tool requires accurate temperature data for these semiconductor devices and interconnects in order to reliably assess the expected performance of the semiconductor chip design.

Despite this, conventional thermal analysis tools assume a single, uniform temperature throughout the semiconductor chip. The resultant designs thus do not always conform to the design standards or parameters. Moreover, most known methods for modeling or simulating thermal gradients of semiconductor chips for analysis are too generic, too computationally complex, or consume too many resources (e.g., processing or memory) to be feasibly applied to the modeling of full-chip thermal gradients.

Therefore, there is a need in the art for a method and apparatus for thermal modeling and analysis of semiconductor chip designs.

SUMMARY OF THE INVENTION

A method and apparatus for modeling and thermal analysis of semiconductor chip designs is provided. One embodiment of a novel method for performing thermal testing of a semiconductor chip design includes calculating full-chip temperatures over the semiconductor chip design (e.g., to identify steep thermal gradients) and modeling the full-chip temperatures in accordance with a geometric multi-grid technique. The geometric multi-grid technique is tailored to determine temperatures within the semiconductor chip design based at least in part on the physical attributes or geometry of the design.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 13A illustrates the heat diffusion between two laterally neighboring control volumes;

FIG. 13B illustrates the heat diffusion between two vertically stacked control volumes;

FIG. 14 is a schematic diagram illustrating the performance of a vertical line smoother, according to the present invention.

To facilitate understanding, identical reference numerals have been used, where possible, to designate identical elements that are common to the figures.

DETAILED DESCRIPTION

Embodiments of the invention generally provide a method and apparatus for thermal modeling and analysis of semiconductor chip designs. By providing temperature data that is computed or calculated based on actual chip information instead of estimated temperature data (e.g., based on an assumed uniform temperature), and modeling this temperature data in accordance with a tailored multi-grid technique, more accurate understanding of the thermal gradients produced by an operating semiconductor chip design can be attained. Moreover, the multi-grid technique described herein can be used to model the thermal gradient without building a problem matrix, and is thus quicker and less computationally intensive than existing modeling techniques using multi-grid solvers.

As used herein, the term "semiconductor chip" refers to any type of semiconductor chip, which might employ analog and/or digital design techniques and which might be fabricated in a variety of fabrication methodologies including, but not limited to, complementary metal-oxide semiconductor (CMOS), bipolar complementary metal-oxide semiconductor (BiCMOS), and gallium arsenide (GaAs) methodologies. Furthermore, as used herein, the term "semiconductor device" refers to a potential active heat dissipating device in a semiconductor chip, including, but not limited to, transistors, resistors, capacitors, diodes and inductors. The terms "wire", "interconnect" or "wire interconnect" as used herein refer to any of various means of distributing electrical signals (which may be analog or digital, static or dynamic, logic signals or power/ground signals) from one place to another. "Interconnects" may be on a semiconductor chip itself, used in the packaging of the semiconductor chip, deployed between the semiconductor chip and the packaging, or used in a variety of other ways.

Figure 1:
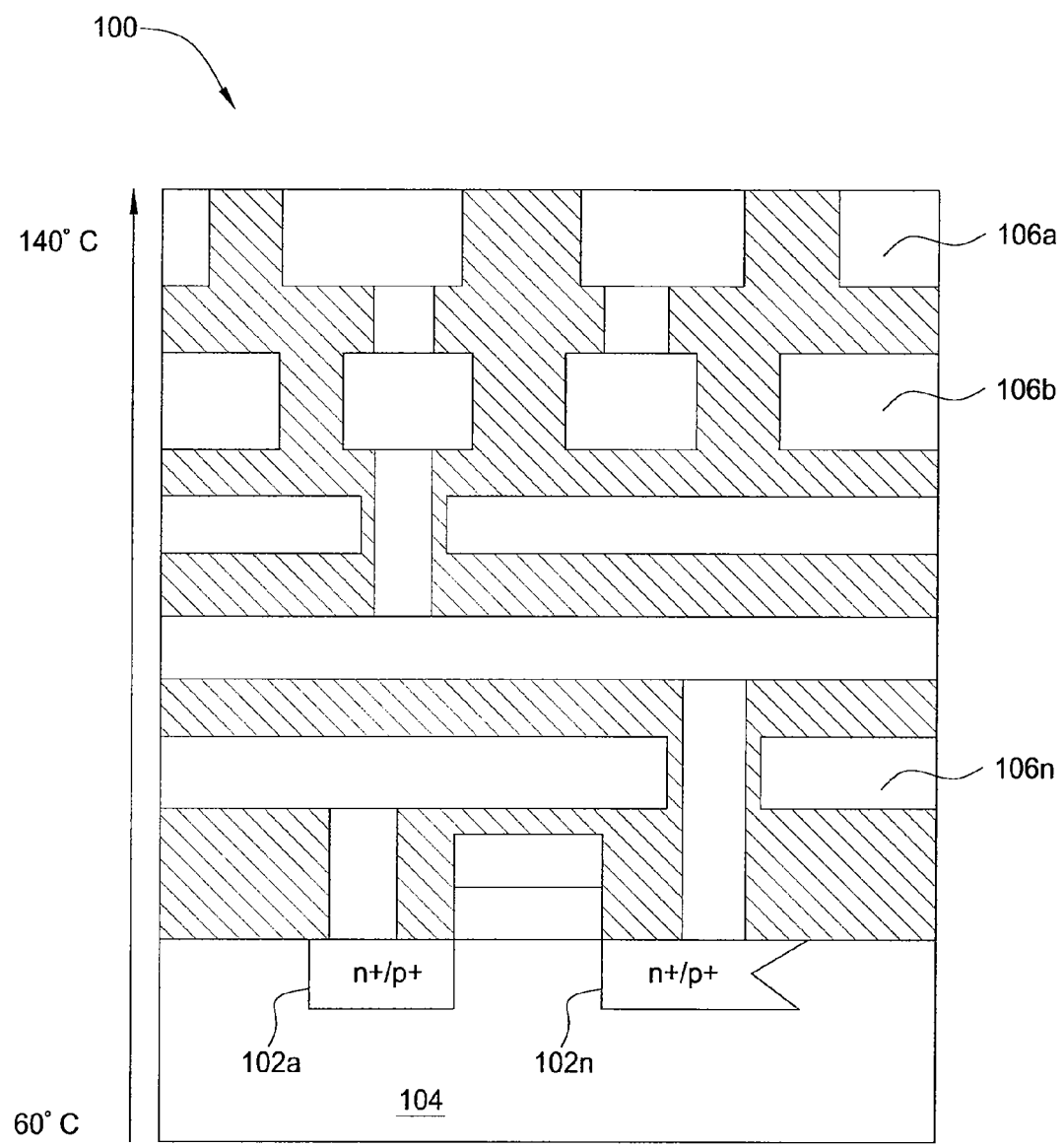
FIG. 1 is a schematic diagram illustrating an exemplary semiconductor chip.
Figure 2:
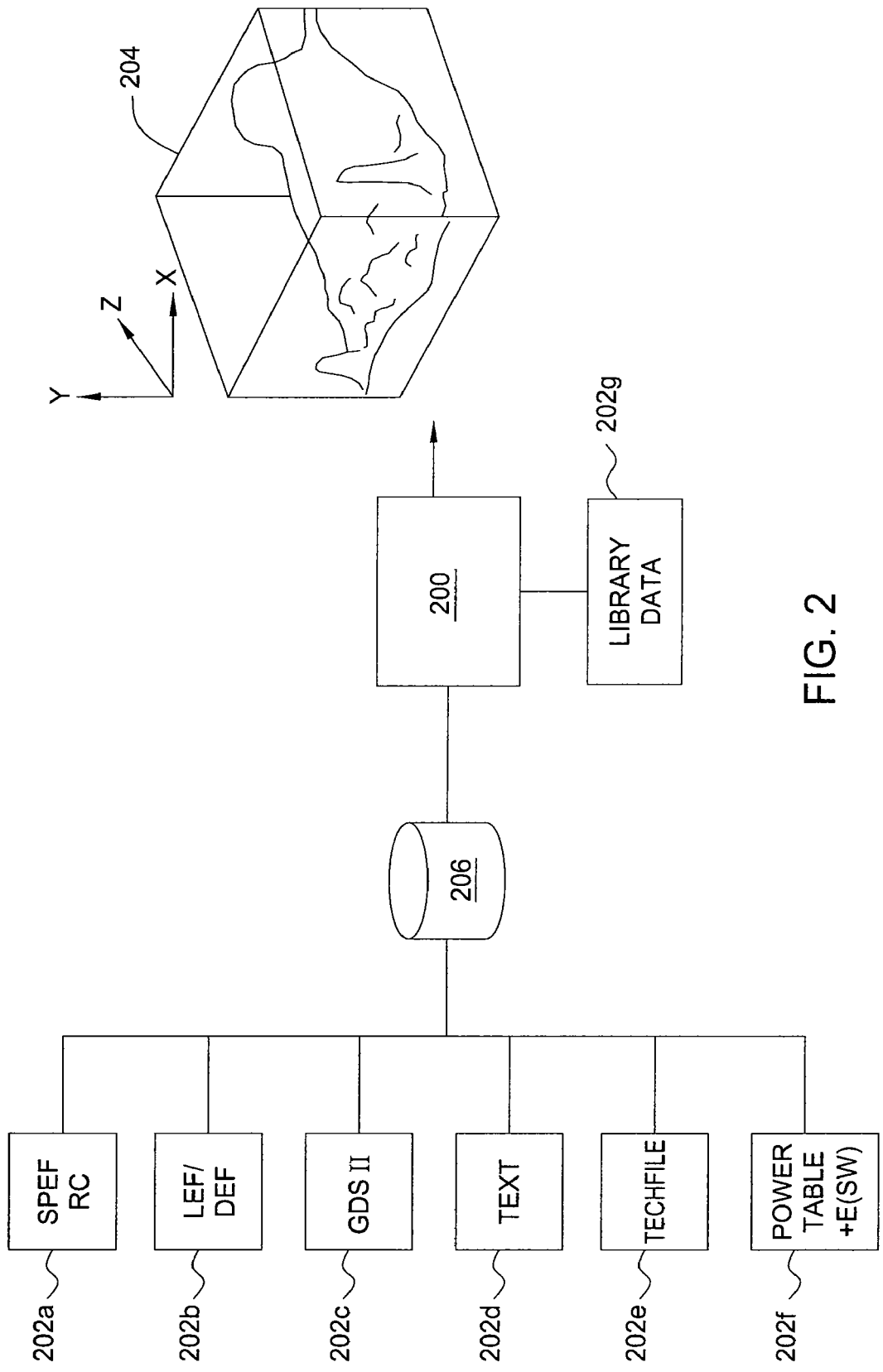
FIG. 2 is a schematic diagram illustrating one implementation of a thermal analysis tool according to the present invention.

FIG. 2 is a schematic diagram illustrating one implementation of a thermal analysis tool 200 according to the present invention. As illustrated, the thermal analysis tool 200 is adapted to receive a plurality of inputs 202a-202g (hereinafter collectively referred to as "inputs 202") and process these inputs 202 to produce a full-chip (e.g., three-dimensional) thermal model 204 of a proposed semiconductor chip design.

In one embodiment, the plurality of inputs 202 includes industry standard design data 202a-202f (e.g., pertaining to the actual chip design or layout under consideration) and library data 202g (e.g., pertaining to the semiconductor devices and interconnects incorporated in the design). In one embodiment, the industry standard design data includes one or more of the following types of data: electrical component extraction data and extracted parasitic data (e.g., embodied in standard parasitic extraction files, or SPEFs, 202a), design representations including layout data (e.g., embodied in Library Exchange Format/Design Exchange Format, or LEF/DEF files 202b, Graphical Design Format II, or GDSII, files 202c and/or text files 202d), manufacturer-specific techfiles 202e describing layer information and package models, user-generated power tables 202f including design data (e.g., including a switching factor, E(sw)). In one embodiment, this industry standard design data 202a-202f is stored in a design database 206 such as an open access database or a proprietary database. In one embodiment, the library data 202g is embodied in a library that is distributed by a semiconductor part manufacturer or a library vendor. In another embodiment, the library incorporating the library data 202g can be built in-house by a user.

In one embodiment, the library data 202g includes transistor and diode models that are used to characterize the transistor resistances ($R_{dv}$) of the driver circuits, e.g., such as models available through Berkeley short-channel Insulated Gate Field Effect Transistor (IGFET) model (BSIM) models used by circuit simulators including Simulation Program with Integrated Circuit Emphasis (SPICE) or HSPICE, commercially available from Synopsys, Inc. of Mountain View, Calif. and Heterogeneous Simulation Interoperability Mechanism (HSIM, commercially available from Nassda Corporation of Santa Clara, Calif.), all developed at the University of California at Berkeley.

As mentioned above, the plurality of inputs 202 are provided to the thermal analysis tool 200, which processes the data in order to produce a full-chip thermal model 204 of a proposed semiconductor chip design. In one embodiment, the full-chip thermal model is a three-dimensional thermal model.

Thus, as described above, embodiments of the present invention rely on library data representing the electrical properties of a semiconductor chip design (e.g., the resistance and capacitance at various points) and the manners in which these properties may vary with respect to each other and with respect to other phenomena (e.g., temperature or fabrication variations). Those skilled in the art will appreciate that these electrical properties may be specified or calculated in any number of ways, including, but not limited to, table-driven lookups, formulas based on physical dimensions, and the like.

Figure 3:
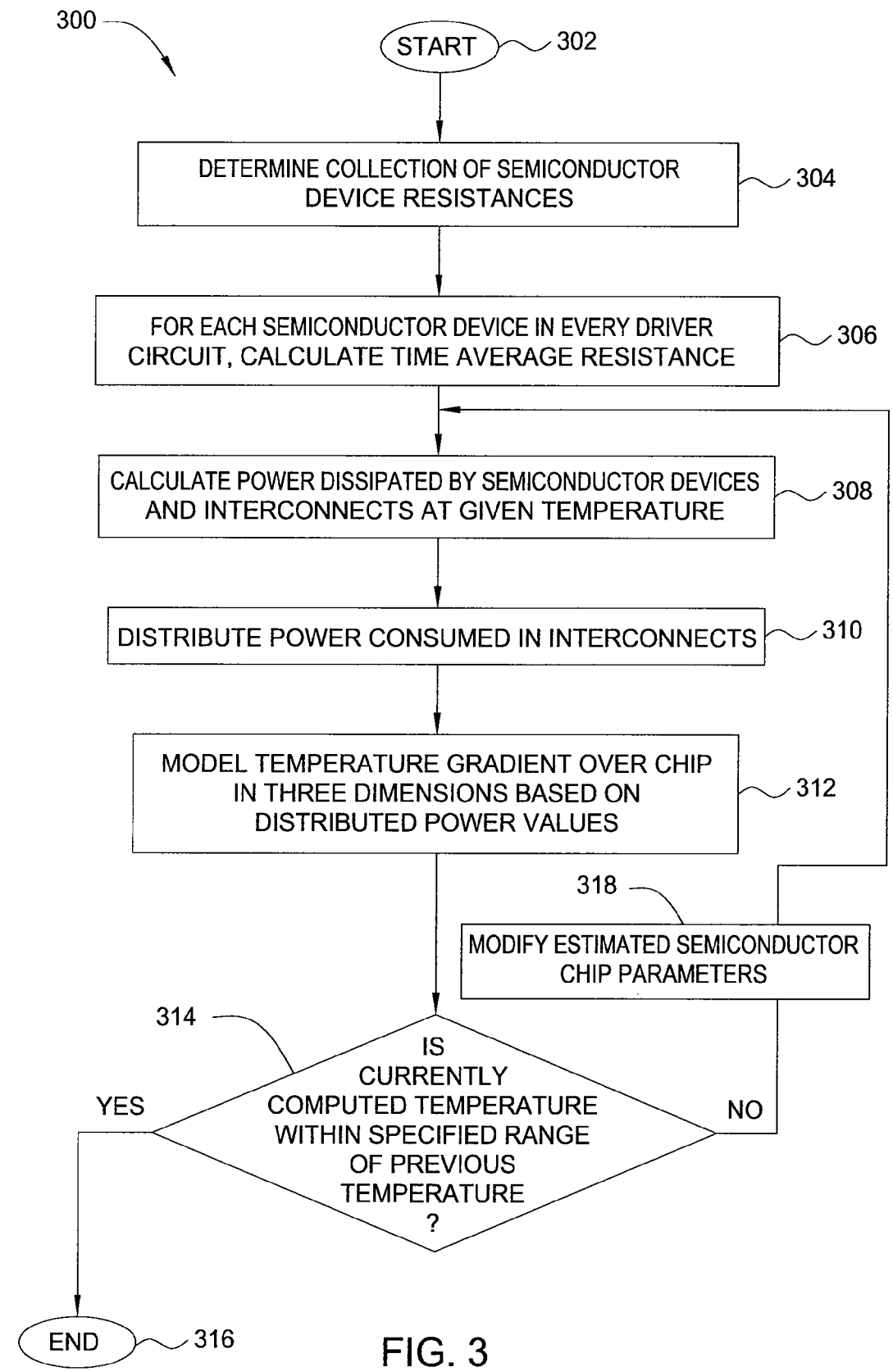
FIG. 3 is a flow diagram illustrating one embodiment of a method for performing three-dimensional thermal analysis of a semiconductor chip design according to the present invention.

FIG. 3 is a flow diagram illustrating one embodiment of a method 300 for performing full-chip thermal analysis of a semiconductor chip design according to the present invention. The method 300 may be implemented, for example, in the thermal analysis tool 200 illustrated in FIG. 2. In one embodiment, the method 300 relies on the computation of power dissipated by various semiconductor devices of the semiconductor chip design. As will be apparent from the following discussion, this power computation may be performed in any number of ways, including, but not limited to, table-driven lookups, computations based on electrical properties, circuit simulations, and the like. Moreover, those skilled in the art will appreciate that although the following description discusses the effects of resistance on power dissipation, power dissipation computations could be based on any number of other electrical properties or parameters, including, but not limited to, capacitance, inductance and the like. Moreover, the computations could be static or dynamic.

The method 300 is initialized at step 302 and proceeds to step 304, where the method 300 determines the collection of semiconductor devices (e.g., transistor, resistors, capacitors, diodes inductors and the like) and their resistances. In one embodiment, the method 300 determines this information by reading one or more of the chip layout data (e.g., in GDS II, DEF and/or text format), layer and package model data (e.g., from one or more techfiles), and initial power and power versus temperature data for the semiconductor devices (e.g., from the library data). In one embodiment, initial power values and power values as a function of temperature may be recorded within a common power table for acceptable operating ranges for the driver circuits within the chip design. The driver circuits may be at semiconductor device level or at cell level, where cell level circuits represent an abstraction of interconnected semiconductor devices making up a known function.

In step 306, the method 300 uses the information collected in step 304 to calculate the time average resistance values for every semiconductor device in every driver circuit of the chip design, as well as for every diode junction. These time-average resistance values relate to changes in semiconductor device dimensions (e.g., such as using higher power transistors in place of lower power transistors in a chip design). In one embodiment, the time average resistance value, $R_{average}$ for a semiconductor device is calculated as:

$$R_{average} = \frac{\int_0^{t_r} R\,dv(t)dt}{t_r} \quad \text{(EQN. 1)}$$

where $t_r$ is the output transition time of the driver circuit under consideration, e.g., as specified by the library data.

Figure 4:
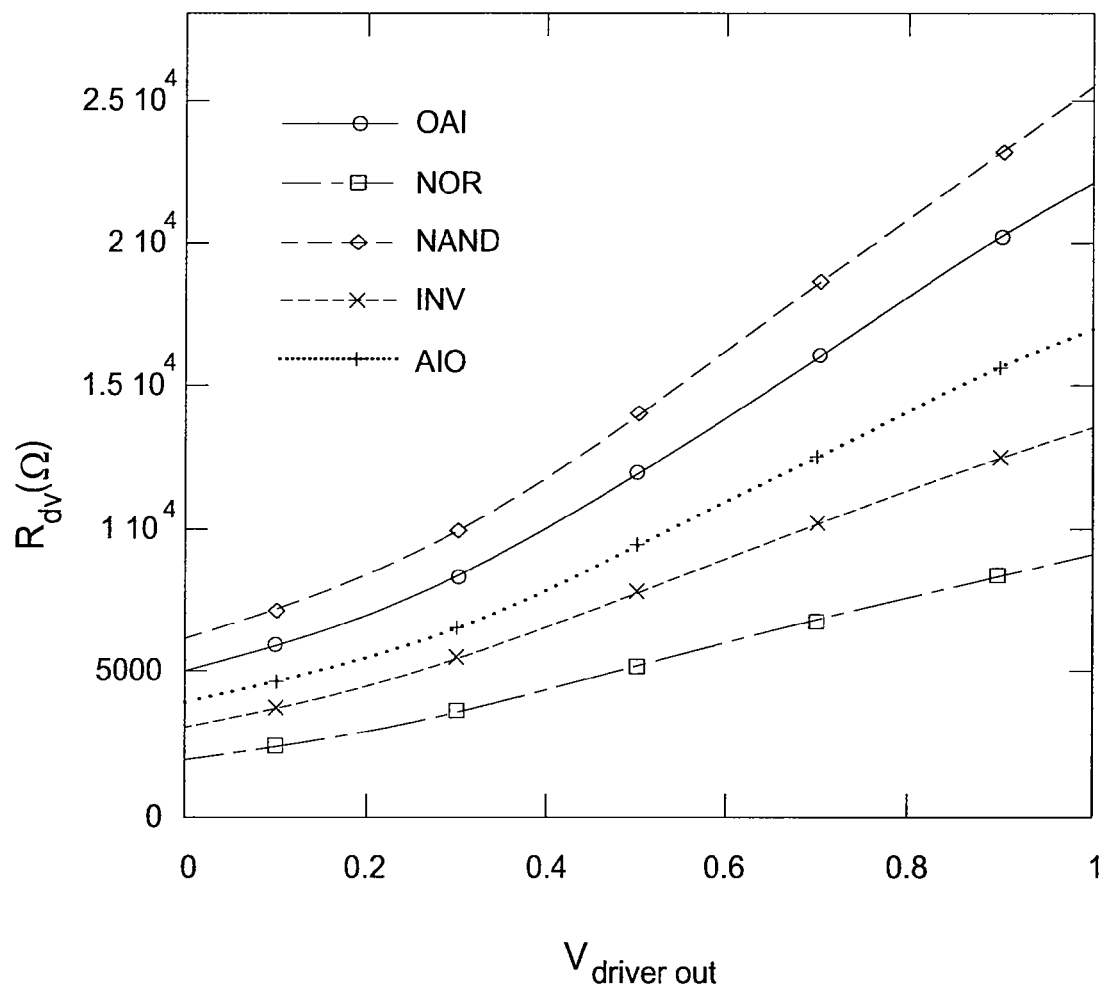
FIG. 4 is a graph illustrating the change in value of transistor resistance for an exemplary negative channel metal oxide semiconductor as a function of the output transition voltage.

FIG. 4 is a graph illustrating the change in value of transistor resistance, $R_{dv}$, for an exemplary negative channel metal oxide semiconductor (nMOS) as a function of the output transition voltage, $V_{driver\_out}$. As illustrated, the power dissipated by a transistor varies during switching. This is also true for the power dissipated in other semiconductor devices and in the interconnects coupled to the semiconductor devices on the chip.

Referring back to FIG. 3, in step 308, the method 300 calculates the power dissipated by the semiconductor devices and interconnects at a given temperature for the design under consideration. In one embodiment of step 308, e.g., where a steady-state analysis of the chip design is being performed, the interdependence of temperature and average power is captured through pre-characterized parameters of the semiconductor devices and interconnects. In one embodiment, the power dissipated by a semiconductor device (in this exemplary case, a transistor), $P_{transistor}$, is calculated as:

$$P_{transistor}=(V_d)^2/R_{average} \quad \text{(EQN. 2)}$$

where $V_d$ is the power supply voltage supplied to the transistor. This voltage, $V_d$, is less than the actual power supply voltage, $V_{dd}$, as the current drawn by the transistors and flowing through the interconnects that connect the transistors to a power supply causes a voltage drop. In another embodiment, the power supply voltage to the transistor $V_d$ could be divided by the maximum or minimum resistance value, $R_{max}$ or $R_{min}$, in order to calculate the power dissipated in the transistor. In one embodiment, a decision as to whether to use an average, minimum or maximum resistance value to calculate $P_{transistor}$ is based at least in part on whether additional conditions, such as the operation of the circuit, are to be evaluated.

While equations for calculating the power dissipation of transistors have been provided herein by way of example, those skilled in the art will appreciate that various methods of calculating power dissipation for other semiconductor devices, such as resistors, capacitors and diodes, are known in the art. For example, equations for calculating the power dissipation of a resistor are discussed in the Proceedings of the Fourth International Symposium on Quality Electronic Design (ISQED 2003), 24-26 Mar. 2003, San Jose, Calif.

In one embodiment, the power dissipated by the interconnects (e.g., power and signal lines), $P_{interconnect}$ is calculated as:

$$P_{interconnect}=P-P_{transistor} \quad \text{(EQN. 3)}$$

where P is the average electrical power dissipated per clock cycle by a digital circuit (e.g., the chip design under consideration; for the full chip, the total P is the sum of the power dissipated by each circuit in the chip) and is available from the library data 202g. In the power lines, power is typically dissipated as Joule heating, where the dissipated power $P_{dissipated}$ may be calculated as:

$$P_{dissipated}=I_p^2 R_{power} \quad \text{(EQN. 4)}$$

where $I_p$ is the current through the power lines and $R_{power}$ is the resistance of the power bus. The value of Ip may be calculated by commercially available tools, such as Voltage Storm, available from Cadence Design Systems, Inc. of San Jose, Calif.

Typically, the power drawn by a switching transistor may be calculated as:

$$P=C_{load}V_{dd}E(sw)(fclk) \quad \text{(EQN. 5)}$$

where $C_{load}$ is the output capacitance as seen by the circuit, E(sw) is the switching activity as defined by the average number of output transitions per clock period, and fclk is the clock frequency. The switching factor or activity, E(sw), is used for evaluating the power table for the initial state of the design. $C_{load}$ may be calculated by parasitic extraction tools, and values for fclk and $V_{dd}$ are typically specified for a given design. In general, half of the power, P, is stored in the capacitance and the other half is dissipated in the transistors and interconnects (e.g., the power and signal lines). Those skilled in the art will appreciate that since $R_{average}$ varies with the transition time of the circuits, and as the switching activity changes for different modes of operation, E(sw) will also change, thereby changing the value of P and the distribution of the amounts of power dissipated in the transistors (e.g., see Equation 2) and interconnects. This will, in turn, change the heat fields and corresponding temperatures within the chip.

In another embodiment of step 308, a transient analysis is performed, wherein the interdependence of temperature and average power in the semiconductor devices and interconnects is based on instantaneous values of power. In this case, power dissipated values are calculated by dynamically simulating the circuit embodied in the chip design under consideration. For example, the circuit may be simulated using any commercially available circuit simulator, such as HSPICE or HSIM, discussed above, or SPECTRE, commercially available from Cadence Design Systems. In one embodiment, the circuit is simulated by solving for values of electrical attributes (e.g., current and voltages) at various points in time. In the case of transient thermal analysis, the thermal analysis system (e.g., thermal analysis tool 200 of FIG. 2) drives the circuit simulator to calculate power at discrete points whenever there is a sufficient change in the temperature of the circuit. In one embodiment, the sufficiency of a temperature change for these purposes is determined by a predefined threshold.

In step 310, the method 300 distributes the power consumed in each of the interconnects. In one embodiment, power is distributed based on the resistance of the wires used in the interconnects, which is defined by the type, thickness and height of the wires used in the interconnects. In one embodiment, the resistance, $R_{interconnect}$, of an interconnect segment is calculated as:

$$R_{interconnect} = \frac{\rho L}{wt} \quad \text{(EQN. 6)}$$

where L is the length of the interconnect segment, w is the width of the segment, t is the thickness of the segment, and $\rho$ is a resistivity constant dependent upon the type of wire used. The resistivity constant, $\rho$, may be found in tables included in any number of integrated circuits textbooks, including Rabaey et al., *Digital Integrated Circuits*, Second Edition, Prentice Hall Electronic and VLSI Series, 2002.

In step 312, the method 300 uses the power dissipation and distribution information calculated in steps 306-310 to model a full-chip (e.g., three-dimensional) temperature gradient over the chip design under consideration. In one embodiment, a full-chip temperature gradient is modeled by adaptively partitioning the volumes of steep temperature gradients over the chip design. In one embodiment, partitioning is done in three dimensions; however, in other embodiments, partitioning may be done in one or two dimensions as well (for example, vertical partitioning may be explicitly considered in how the temperature is modeled). In one embodiment, "steep" temperature gradients are those portions of the overall temperature gradient that are steep relative to other regions of the overall temperature gradient. In one embodiment, techfile data (e.g., pertaining to the dimensions and properties of the chip design layers) and power density data are used to partition the chip design. Power density data is typically contained within the power table provided for a particular state of operation of a chip design. The temperatures in each partition are then determined and annotated accordingly in the three-dimensional model.

In step 314, the method 300 determines whether the currently computed temperature for the chip design falls within a previously specified range. If the method 300 concludes that the currently computed temperature does not fall within this range, the method 300 proceeds to step 318 and modifies the estimated chip parameters (e.g., by changing the resistances of the semiconductor devices and interconnects, resizing the semiconductor devices and interconnect wires, etc.). The method 300 then returns to step 308 and proceeds as discussed above.

Alternatively, if the method 300 determines that the currently computed temperature does fall within the specified range, the method 300 proceeds to step 316 and terminates. Thus, steps of the method 300 may be repeated in an iterative manner until a steady state value is reached, within a specified tolerance. In one embodiment, iteration of these steps may depend on the particular implementation of the method 300. In further embodiments, iteration could include convergence to an absolute value, convergence to a relative value, or the passing of a fixed number or iterations or a fixed amount of time.

Thus, the method 300 employs industry standard design, package and heat sink data in order to produce a more complete and more accurate profile of the temperature gradient created by a semiconductor chip design. By accounting for the distribution of power dissipated in the semiconductor devices and in the interconnects, rather than simply characterizing dissipated power as the power dissipated in the active semiconductor devices (which does not consider simultaneous changes in the electrothermal properties of the semiconductor devices and interconnects), more accurate, full-chip thermal profiling can be achieved.

Chip designers may use the full-chip data produced by the method 300 to design more robust semiconductor chips for particular applications. For example, if the full-chip temperature gradient produced by one iteration of the method 300 does not illustrate acceptable results for a semiconductor chip design, a chip designer may go back and modify the chip design (e.g., by changing the resistances of the semiconductor devices and interconnects, resizing the semiconductor devices and interconnect wires, etc.) in an attempt to achieve more desirable results. The method 300 may then be applied to the modified design to assess the resultant temperature gradient. Those skilled in the art will appreciate that while the method 300 illustrates a series of steps, the present invention is not limited to the particular sequence illustrated, and thus FIG. 3 should be considered only as one exemplary embodiment of the present invention.

In some embodiments, existing performance analysis tools for assessing semiconductor chip designs (e.g., tools that assume a uniform temperature over the semiconductor chip) may be retrofitted or adapted to benefit from the present invention. As will be discussed in greater detail below, the methods and apparatuses of the present invention may be implemented in conjunction with one or more existing performance analysis tools in order to improve assessment of semiconductor chip designs by providing actual temperature data for assessment of temperature-dependent performance parameters (e.g., timing, delay, voltage drops, current flow, power consumption and the like).

Figure 5:
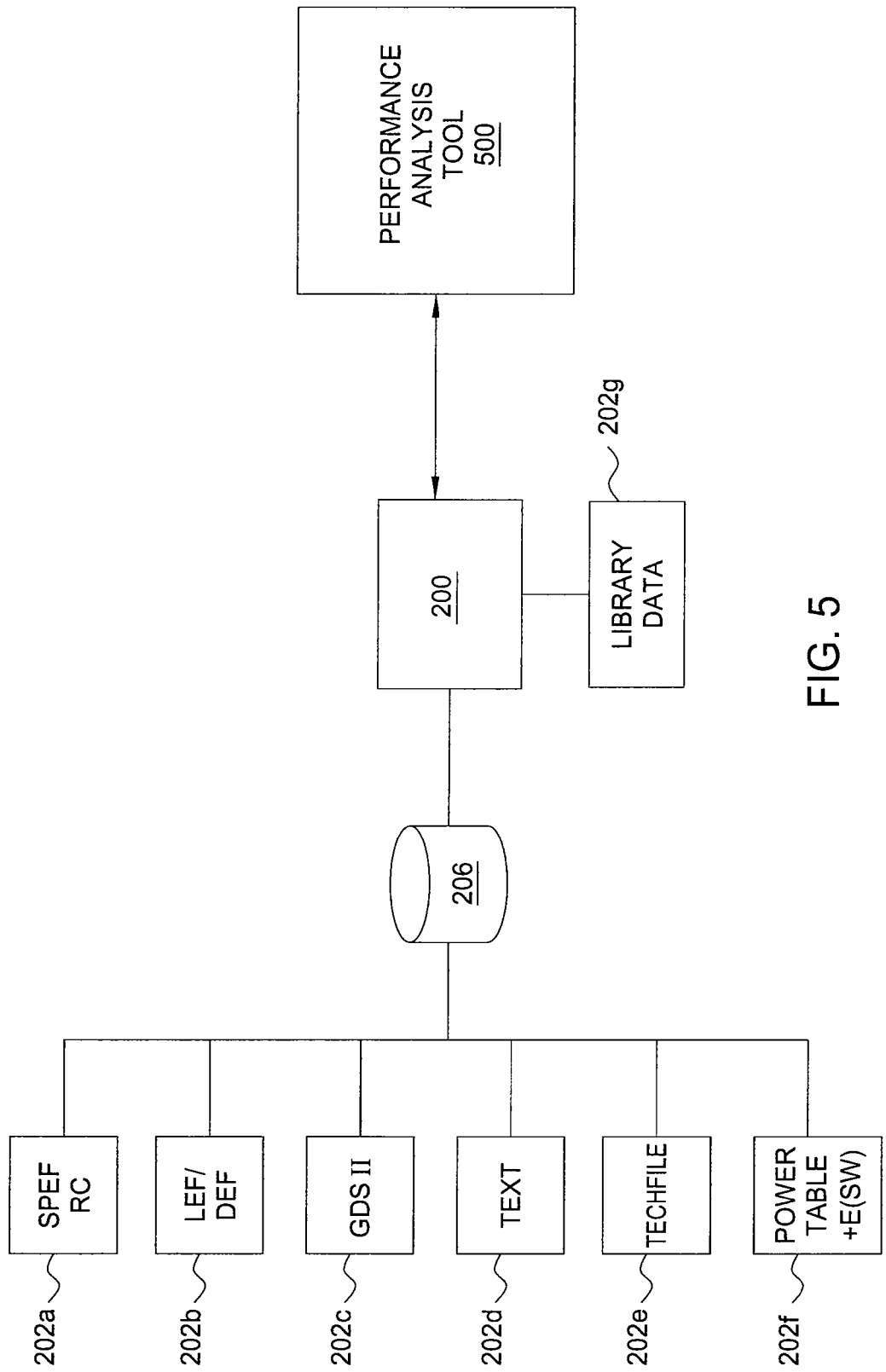
FIG. 5 is a schematic diagram illustrating one implementation of the thermal analysis tool of FIGS. 2-4 in conjunction with a conventional performance analysis tool, according to the present invention.

FIG. 5 is a schematic diagram illustrating one implementation of the thermal analysis tool 200 in conjunction with a conventional performance analysis tool 500, according to the present invention. As previously discussed, the thermal analysis tool 200 is adapted to receive a plurality of inputs 202 (including industry standard design data 202a-202f and library data 202g) and process these inputs 202 to produce a full-chip thermal model of a proposed semiconductor chip design.

Moreover, the thermal analysis tool 200 is in bi-directional communication with the performance analysis tool 500. As will be discussed in greater detail below, the thermal analysis tool is adapted modify various design data (including the resistances and delays of the semiconductor devices and the interconnects) and provide this modified data to the performance analysis tool 500. In some cases, modification of the design data is aided by data (including capacitive load and signal waveform changes) that is provided to the thermal analysis tool 200 by the performance analysis tool 500. Thus, the effects that the different temperatures of the individual semiconductor devices and interconnects have on the signals within the semiconductor chip can be properly accounted for in the performance analysis.

Moreover, although FIG. 5 illustrates only a single performance analysis tool 500 interacting with the thermal analysis tool 200, those skilled in the art will appreciate that multiple performance analysis tools may interact with the thermal analysis tool 200 to evaluate a semiconductor chip design. For example, the thermal analysis tool may interact with SPICE to get delays, and also interact with a timing tool in accordance with the given delays from SPICE.

Alternatively, the full-chip analysis capabilities of the thermal analysis tool 200 may be integrated with the capabilities of the performance analysis tool(s) 500 in a single tool for performing performance analysis based on computed, full-chip temperature data.

Figure 6:
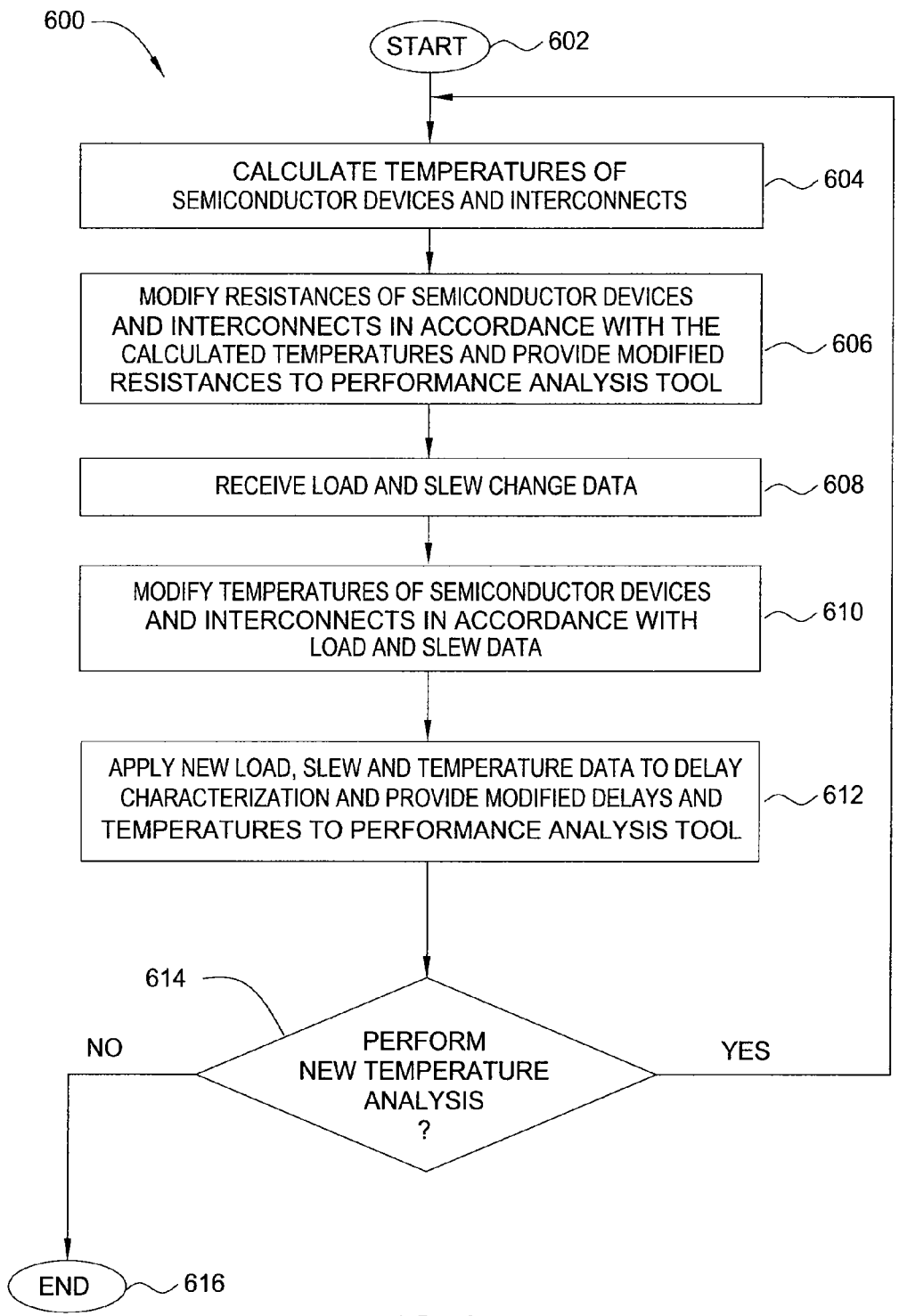
FIG. 6 is a flow diagram illustrating one embodiment of a method for performance analysis using the thermal analysis tool, according to the present invention.

FIG. 6 is a flow diagram illustrating one embodiment of a method 600 for performance analysis using the thermal analysis tool 200, according to the present invention. The method 600 may be executed at, for example, the thermal analysis tool 200.

The method 600 is initialized at step 602 and proceeds to step 604, where the method 600 calculates the temperatures of the semiconductor devices and interconnects in the semiconductor chip design. In one embodiment, this calculation is performed in accordance with the method 300 illustrated in FIG. 3. In another embodiment, this calculation may be performed in accordance with any known method for measuring actual, full-chip temperatures over a semiconductor chip design.

Once the temperatures of the semiconductor devices and the interconnects have been calculated, the method 600 proceeds to step 606 and modifies the resistances of the semiconductor devices and the interconnects in accordance with the calculated temperatures. The method 600 then provides these modified resistances to the performance analysis tool (e.g., performance analysis tool 500) for delay calculation (e.g., based on the modified resistances).

In step 608, the method 600 receives data from the performance analysis tool relating to changes in the capacitive load ("load") and signal waveforms ("slew"). These changes in load and slew are the result of the delay calculation performed by the performance analysis tool using the modified semiconductor device and interconnect resistances.

The method 600 then proceeds to step 610 and modifies the temperatures of the semiconductor devices and interconnects in accordance with the load and slew data received in step 608. Then, the method 600 proceeds to step 612 and applies the new load and slew data, as well as the modified temperatures of the semiconductor devices and interconnects, to a delay characterization. In one embodiment, the method 600 uses the new load and slew data to look up the corresponding delays in the library data (e.g., library data 202g). The method 600 then provides this modified delay and temperature data to the performance analysis tool.

In step 614, the method 600 inquires if a new temperature analysis should be performed. For example, a new temperature analysis may need to be performed if there has been a change in the power consumed by the semiconductor chip design under analysis (e.g., due to the semiconductor chip design performing a different set of operations or going into a different state than the state the semiconductor chip design is presently in). In one embodiment, this determination is made in response to a request or a prompt from the performance analysis tool. If the method 600 determines that a new temperature analysis should be performed, the method 600 returns to step 604 and proceeds as described above. Alternatively, if the method 600 determines that a new temperature analysis should not be performed, the method 600 terminates in step 616.

Thus, the method 600 enables a conventional performance analysis tool for assessing semiconductor chip designs to be retrofitted or adapted with the capability to account for actual temperatures within the semiconductor chip. By providing computed temperature data instead of estimated temperature data (e.g., based on an assumed—and usually erroneous—uniform temperature), more accurate assessment of temperature-dependent performance parameters such as timing, delay, voltage drops, current flow, power consumption and the like can be achieved. Thus, a semiconductor chip designed in accordance with the method 600 will be less prone to failure (e.g., due to under-estimation of temperature) and less likely to waste expensive materials (e.g., due to over-estimation of temperature). Those skilled in the art will appreciate that, while the method 600 has been described in terms of assessing timing and delay based on computed temperatures, the method 600 is applicable to assessments of other performance parameters as well.

Figure 7:
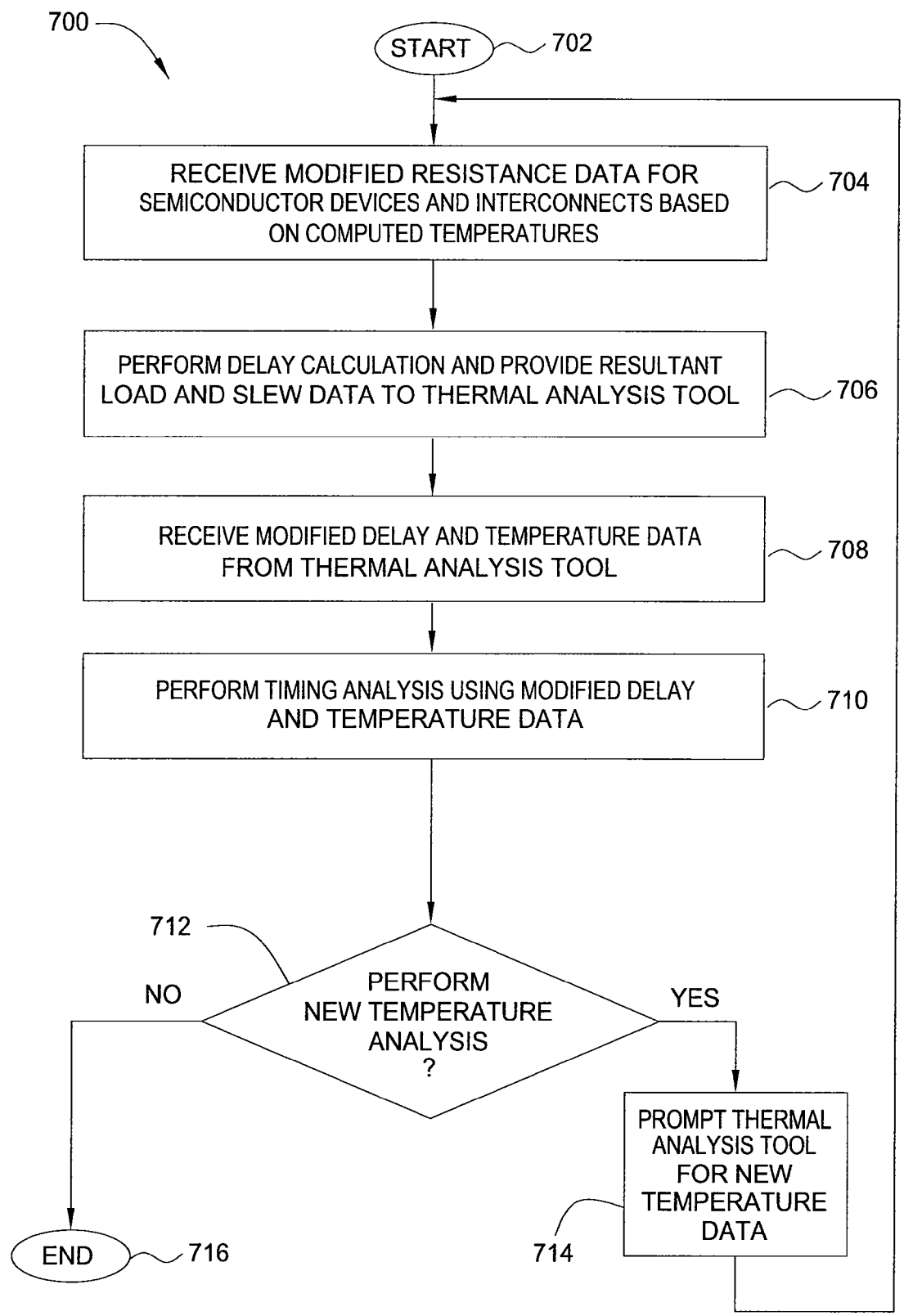
FIG. 7 is a flow diagram illustrating one embodiment of a method for performance analysis using actual temperature data, according to the present invention.

FIG. 7 is a flow diagram illustrating one embodiment of a method 700 for performance analysis using computed temperature data (e.g., received from the thermal analysis tool 200), according to the present invention. The method 700 may be executed at, for example, the performance analysis tool 500.

The method 700 is initialized at step 702 and proceeds to step 704, where the method 700 receives modified resistance data for the semiconductor devices and interconnects in the semiconductor chip design. This modified resistance data is modified in relation to original resistance values assigned to the semiconductor devices and interconnects by the performance analysis tool. The modified resistances are based on computed temperatures within the semiconductor chip design, e.g., computed by a full-chip thermal analysis tool such as the thermal analysis tool 200.

In step 706, the method 700 performs a delay calculation using the modified resistances received in step 704. This delay calculation results in changes to original load and slew values, which the method 700 provides to the thermal analysis tool for further processing.

In step 708, the method 700 receives modified delay and temperature data from the thermal analysis tool, e.g., in response to the load and slew data sent in step 706. The method 700 then proceeds to step 710 and performs a timing analysis using the modified delay and temperature data. In this manner, the timing analysis is now "temperature aware" in the sense that it is performed using computed temperature data instead of an assumed uniform value for temperate. In one embodiment, the nature of the modified delay and temperature data received from the thermal analysis tool will guide the selection of specific computation methods (e.g., direct solvers, multi-grid solvers, finite element solvers, integral method-based solvers, analytical solvers and the like) implemented for the timing analysis. For example, the size of the problem to be solved may dictate the selection of a computation method. A direct solver may be more accurate than other computation methods for solving relatively small problems; however, an iterative, conjugate-gradient or multi-grid solver is typically capable of handling larger problems than is a direct solver.

The method 700 then proceeds to step 712 and inquires if a new temperature analysis should be performed. If the method 700 determines that a new temperature analysis should be performed, the method 700 proceeds to step 714 and prompts the thermal analysis tool for new temperature data. The method 700 then returns to step 704 and proceeds as described above using the new temperature data provided by the thermal analysis tool in response to the prompt. Alternatively, if the method 700 determines in step 712 that a new temperature analysis should not be performed, the method 700 terminates in step 716.

As discussed above in connection with the method 700, any one or more of a plurality of computational methods may be employed in accordance with the present invention for providing semiconductor chip temperature data (see, e.g., step 714 of the method 700). This is also true for modeling the resultant thermal gradients of a semiconductor chip design (e.g., in accordance with step 312 of the method 300), which involves solving heat equations within different materials contained within the semiconductor chip. Each material contained within the semiconductor chip has characteristic thermal conduction properties, based upon the material's shape, material properties (e.g., heat diffusion in lateral and vertical directions, time constant for heat propagation in spatial directions from a heat source, etc.), contact with semiconductor devices and proximity to other heat conducting materials.

By way of background, it is useful to note that the heat diffusion in a semiconductor chip is governed by the partial differential equation:

$$\rho c_p \frac{\partial}{\partial n_i}(r, t) = \nabla \cdot (k(r, T) \nabla T(r, t)) + g(r, t) \quad \text{(EQN. 7)}$$

subject to the boundary condition $$k(r, T) \frac{\partial}{\partial n_i} T(r, t) + h_i T(r, t) = f_i(r, t) \quad \text{(EQN. 8)}$$

where T is the temperature; r denotes the location; $\rho$ is the material density; $c_p$ is the specific heat; k is the thermal conductivity of the material; g is the power density of the heat sources (e.g., semiconductor devices); $n_i$ is the outward direction normal to the boundary surface i; $h_i$ is the heat transfer coefficient at the boundary surface i; and $f_i$ is an arbitrary function at the boundary surface i.

Applying the backward Euler formula and the seven-point finite difference discretization to the left and right sides of EQN. 7 respectively leads to a discretized equation at an interior point of a homogeneous material:

$$\rho c_p \Delta x \Delta y \Delta z \frac{T_{i,j,k}^{n+1} - T_{i,j,k}^n}{\Delta t} = \quad \text{(EQN. 9)}$$
$$-2(G_x + G_y + G_z) T_{i,j,k}^{n+1} + G_x T_{i-1,j,k}^{n+1} + G_x T_{i+1,j,k}^{n+1} + G_y T_{i,j-1,k}^{n+1} +$$
$$G_y T_{i,j+1,k}^{n+1} + G_z T_{i,j,k-1}^{n+1} + G_z T_{i,j,k+1}^{n+1} + \Delta x \Delta y \Delta z \cdot g_{i,j,k}$$

where $\Delta t$, $\Delta x$, $\Delta y$ and $\Delta z$ are discretization steps in the time, x, y and z directions, respectively, and $G_x$, $G_y$ and $G_z$ are defined as:

$$G_x = \frac{k \Delta y \Delta z}{\Delta x}; \quad G_y = \frac{k \Delta y \Delta z}{\Delta y}; \quad G_z = \frac{k \Delta y \Delta z}{\Delta z} \quad \text{(EQN. 10)}$$

Modifications must be made in EQN. 9 when discretizing EQN. 7 at the boundary or material interface (e.g., the interface between two material layers of the semiconductor chip, as discussed in greater detail below). For thermal steady-state analysis, the terms on the left hand side of EQNs. 7 and 9 can be dropped, which conventionally leads to a linear matrix problem. One aim of the present invention is to simplify the modeling of a semiconductor chip's thermal gradient by eliminating the need to explicitly solve such a linear matrix.

Figure 8:
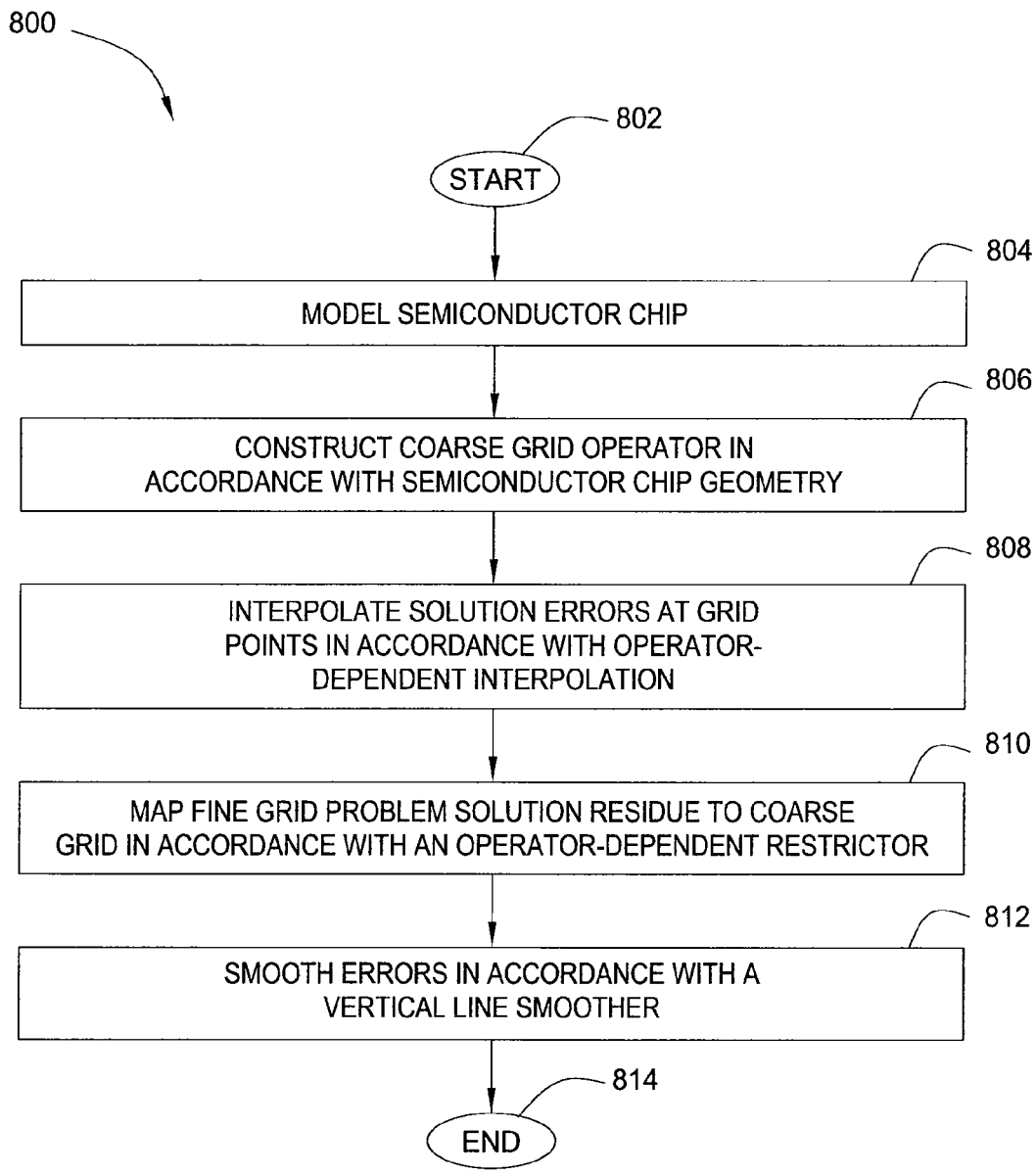
FIG. 8 is a flow diagram illustrating one embodiment of a multi-grid method for modeling a thermal gradient of a semiconductor chip, according to the present invention.

FIG. 8 is a flow diagram illustrating one embodiment of a multi-grid method 800 for modeling a thermal gradient of a semiconductor chip, according to the present invention. In particular, the multi-grid method 800 is a geometric multi-grid method that uses physical attributes of the semiconductor chip (e.g., the physical attributes of the semiconductor chip design) as a means of formulating a problem through which the temperatures within the semiconductor chip can be determined. The method 800 is initialized at step 802 and proceeds to step 804, where the method 800 physically models the semiconductor chip to be analyzed. In one embodiment, the physical semiconductor chip model is a layered three-dimensional model based on the physical attributes (e.g., geometry and topology) of the semiconductor chip design.

Figure 9A:
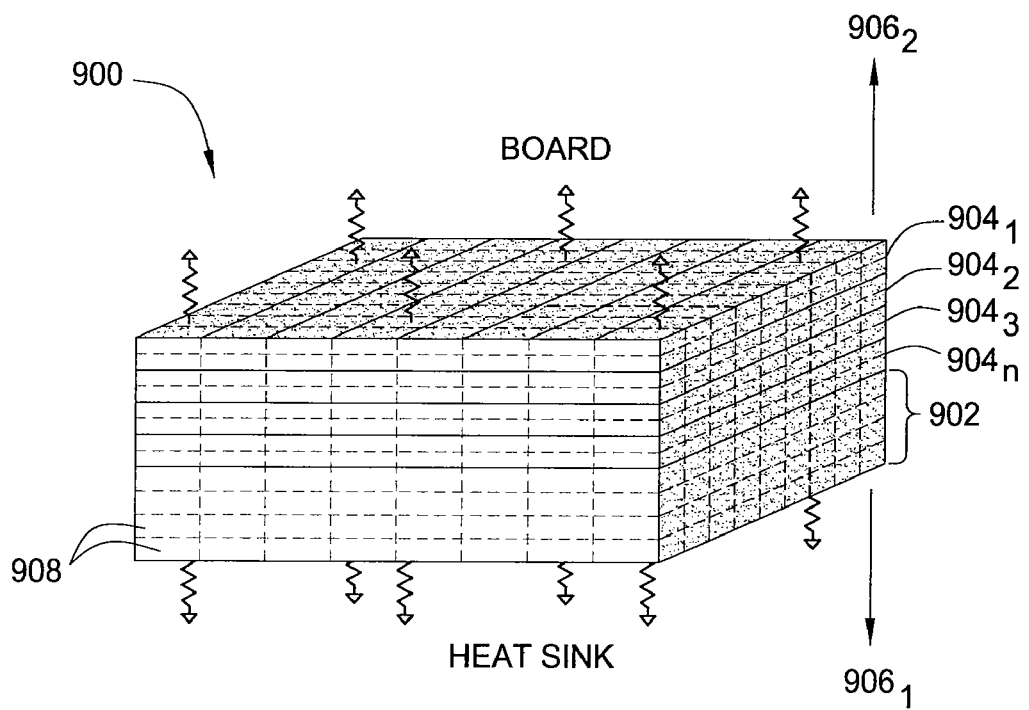
FIG. 9A is a schematic diagram illustrating one embodiment of a semiconductor chip.

FIG. 9A is a schematic diagram illustrating one embodiment of a semiconductor chip 900. Specifically, FIG. 9A illustrates one embodiment of a physical model of a semiconductor chip (e.g., constructed in accordance with step 804 of the method 800). As illustrated, the semiconductor chip 900 comprises a substrate 902 and a plurality of material layers $904_1$-$904_n$ (hereinafter collectively referred to as "material layers 904") deposited thereon, comprising, for example, metal layers, polysilicon layers and interlayer dielectric layers. For the purposes of the present invention, two major heat conduction paths are modeled, where heat is assumed to be generated only by power-dissipating semiconductor devices (e.g., active devices, resistors, etc.): a first heat conduction path $906_1$ through the heat sink to ambient, and a second heat conduction path $906_2$ through the semiconductor chip 900 to the board.

In one embodiment, the material layers 904 are heterogeneous due to complex layout patterns and have submicron thicknesses. Thus, proper thermal modeling of the material layers 904 plays a significant role in a full-chip thermal analysis. In one embodiment, the material layers 904 are modeled in a manner that captures the average thermal behaviors of small regions or control volumes (e.g., on the scale of a few ten microns on each side) of the material layers 904 and the interactions of these control volumes with neighboring control volumes.

Figure 9B:
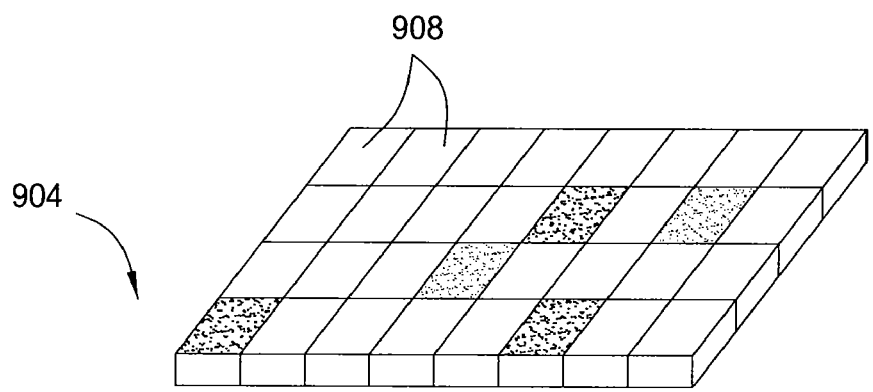
FIG. 9B is a schematic diagram illustrating one exemplary material layer of the semiconductor chip of FIG. 9A, where the material layer has been laterally divided into a plurality of control volumes.

FIG. 9B is a schematic diagram illustrating one exemplary material layer 904 of the semiconductor chip 900, where the material layer 904 has been laterally divided into a plurality of control volumes 908. As illustrated by the control volumes 908 of various shading, the material layer 904 is heterogeneously composed. In one embodiment, all control volumes 908 are of approximately equal size. A simple equivalent thermal conductivity k((r, T)) may be computed for each control volume 908 by taking a weighted average of the thermal conductivities k((r, T)) of the various materials in the control volume 908.

Referring back to FIG. 8, in step 806, the method 800 constructs a coarse grid operator in accordance with the physical attributes of the semiconductor chip 900 (e.g., as defined by the modeling step 804). In one embodiment, a coarse grid operator for the semiconductor chip 900 is a simple h→2h type grid coarsening operator constructed by applying coarsening in three directions (x, y and z) to the substrate 902 and applying coarsening in only two directions (x and y) to the material layers 904. A grid operator constructed in this manner avoids the explicit formation of problem matrices throughout the multi-grid hierarchy, discussed in further detail below, which significantly simplifies the method 800.

Figure 10:
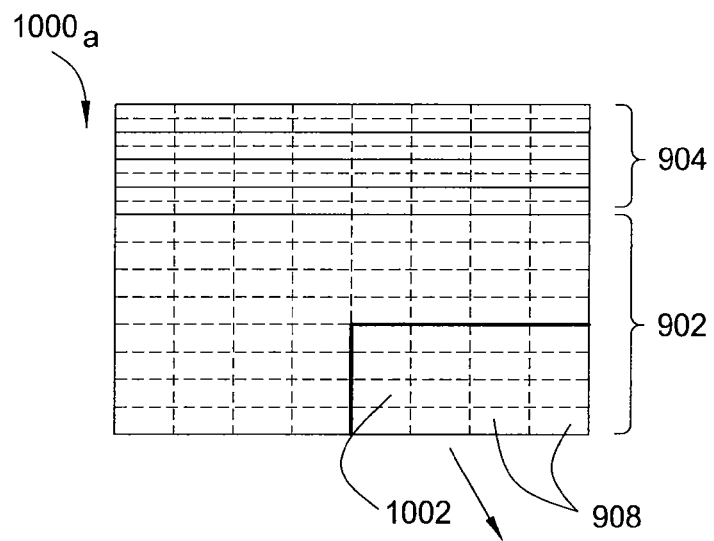
FIG. 10 is a schematic diagram illustrating one embodiment of a hierarchical set of grids representing the semiconductor chip of FIG. 9A in the z direction.
Figure 10:
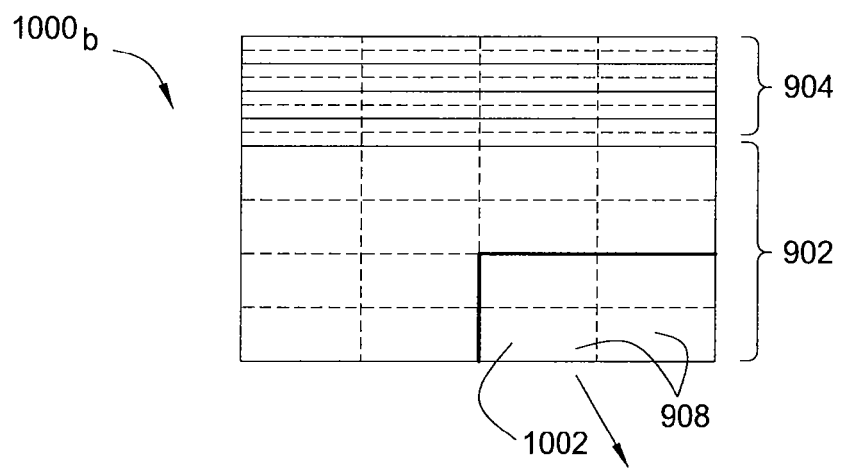
Figure 10:
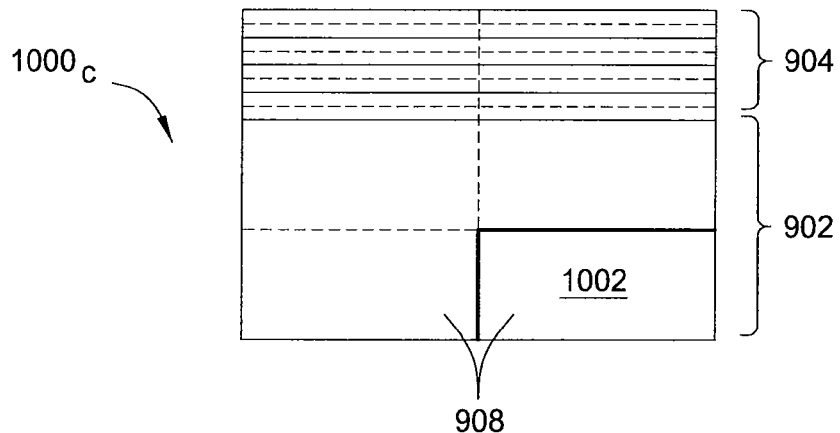

FIG. 10 is a schematic diagram illustrating one embodiment of a hierarchical set of mathematical grids 1000a-1000c (hereinafter collectively referred to as "grids 1000") representing the semiconductor chip 900 in the z direction. As illustrated, construction of the coarse grid operator begins with the definition of a first grid 1000a, derived in one embodiment from the physical model of the semiconductor chip (e.g., as illustrated in FIGS. 9A and 9B). A plurality of control volumes 908 are defined within the first grid 1000a. The first grid 1000a is the finest of the grids 1000 in that it comprises the largest number of control volumes 908 (having the smallest sizes) relative to the remaining grids 1000.

In one embodiment, the fineness of the first grid 1000a depends on the semiconductor chip being analyzed and is determined at least in part by the power density and the size of the semiconductor devices incorporated in the semiconductor chip design (where the semiconductor devices may be, for example, active devices or resistors that conduct current and dissipate power or parasitic diodes that generate power). In one embodiment, the physical model of the semiconductor chip (e.g., as constructed in step 804 of the method 800) forms the first grid 1000a. The method 800 then coarsens and refines the first grid 1000a multiple times, as discussed in greater detail below, to reduce the numerical error of the temperature computation.

A second grid 1000b, coarser than the first grid 1000a, is defined by applying discretization to the material layers 904 and substrate 902 of the first grid 1000a. In one embodiment, the discretization step size is doubled for the second grid with respect to the first grid. As discussed above, the doubled discretization step size is applied in two directions (x and y) for the material layers 904, but is applied in three directions (x, y and z) for the substrate 902. Thus, for example, a region 1002 of the second grid 1000b will comprise fewer discrete control volumes 908 than the corresponding region 1002 of the first grid 1000a. Accordingly, a third grid 1000c, even coarser than the second grid 1000b, is constructed in a similar manner (e.g., by applying the same coarsening parameters—the discretization step is doubled in two directions for the material layers 904 and doubled in three directions for the substrate 902) and will comprise even fewer control volumes 908 than the second grid 1000b.

As described above, grids 1000 may be coarsened and subsequently tightened or refined multiple times in order to reduce the numerical error of the temperature computation. Thus, the method 800 may be said to "cycle" forward and back through a hierarchical set of successively coarser grids corresponding to the semiconductor chip being analyzed. The number of grids in this hierarchical set will typically depend on a tolerable limit for smoothing the numerical error. In one embodiment, a grid "schedule" is defined as the number of times through which the hierarchical set of grids is cycled. For example, a "V" cycle is one in which the grid schedule is one (e.g., one complete cycle progressing from a fine grid to a relatively coarser grid and then back); in a "W" cycle, the grid schedule is two complete cycles, where each of the two cycles is substantially similar to the single cycle of the "V" cycle. In some embodiments of the present invention, a W cycle is sufficient for the temperature calculation purposes; however, those skilled in the art will appreciate that the grid schedule may vary depending upon particular applications.

As one moves down the grid hierarchy, an equivalent thermal conductivity $k((r, T))$ is successively computed for each control volume 908. The thermal conductivity $k((r, T))$ for any given control volume 908 may be computed as the weighted average of thermal conductivities $k((r, T))$ of the control volumes 908 contained within the same region of the next finer grid 1000. Thus, for example, the thermal conductivity $k((r, T))$ of the region 1002 of the third grid 1000c (which comprises a single control volume 908) can be computed as the weighted average of the thermal conductivities $k((r, T))$ of the control volumes 908 contained within the corresponding region 1002 of the second grid 1000b (which comprises four control volumes 908). The coarse grid operator is thus obtained by a direct discretization of the partial differential equation of EQN. 7 using the new grid size and the updated thermal conductivities $k((r, T))$.

Referring back to FIG. 8, once the coarse grid operator has been constructed, the method 800 proceeds to step 808 and interpolates solution correction at points in the grids in accordance with operator-dependent interpolation. Specifically, the method 800 performs interpolation to derive intermediate grid points on a fine grid (e.g., grid 1000b) from a coarser grid (e.g., grid 1000c), as the fine grid will typically have only half the number of grid points that the next coarser grid has. Thus, interpolation is performed starting at a coarse grid and progressing toward finer grids.

The points at which the solution errors are interpolated represent corners of the control volumes 908. Since a coarse grid 1000 has a fewer number of grid points than the next finest grid 1000, interpolation is needed to compute the solution correction at the fine grid points that are not included in the coarser grid(s) 1000. This becomes complicated for heterogeneous structures such as semiconductor chips, where various on-chip materials can have vastly different thermal properties. For example, at the interface between an interface layer dielectric layer and a metal layer, the thermal conductivity $k((r, T))$ can jump by as much as approximately two orders of magnitude. At material interfaces with jumping thermal conductivities $k((r, T))$, $\nabla T(r, t)$ is no longer continuous, but is $k((r, T)) \cdot \nabla T(r, t)$. Thus, an operator-dependent interpolator is an interpolator that is based on the continuity of $k((r, T)) \cdot \nabla T(r, t)$. Interpolation is therefore built based on the discretization of the partial differential equation of EQN. 7, rather than based simply on geometric distances (as is the case, for example with tri-linear interpolators).

Figure 11:
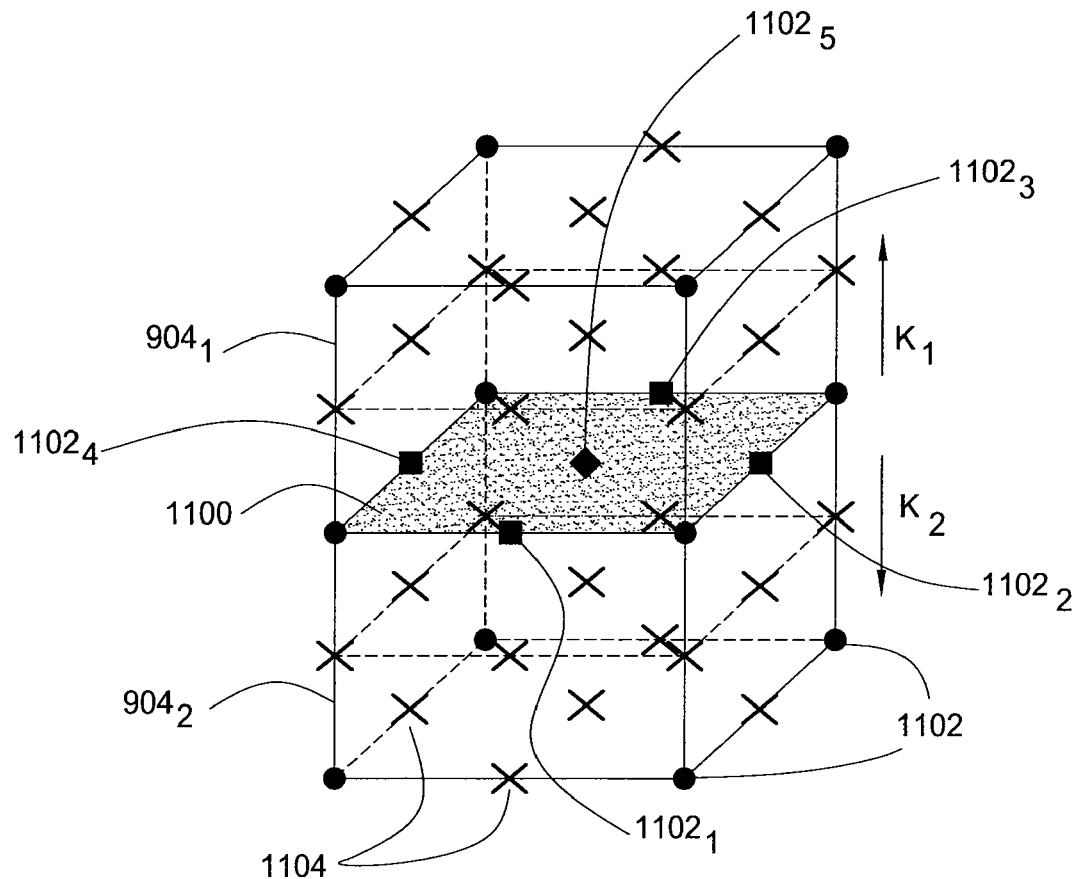
FIG. 11 is a schematic diagram illustrating a localized interface between two material layers in a portion of the semiconductor chip of FIG. 9A.

FIG. 11 is a schematic diagram illustrating a localized interface 1100 (e.g., a material boundary) between two material layers $904_1$ and $904_2$ in a portion of the semiconductor chip 900. The interface 1100 is assumed to lie on a grid line, e.g., a clean boundary between two control volumes. Material layer $904_1$ has a thermal conductivity of $k_1$, while material layer $904_2$ has a thermal conductivity of $k_2$. Common grid points 1102, indicated by darkened circles, lie on the boundaries of control volumes defined by both fine and coarse grids (e.g., the common grid points 1102 locate corners of control volumes defined by the coarsest grid); thus, common grid points 1102 are interpolated in accordance with the operator-dependent interpolator. Fine grid points 1104 (e.g., points defining corners of control volumes defined only by a finer grid than the one illustrated), indicated by x's, do not lie on the interface 1100, and thus may be interpolated in accordance with conventional tri-linear interpolation methods.

Figure 12:
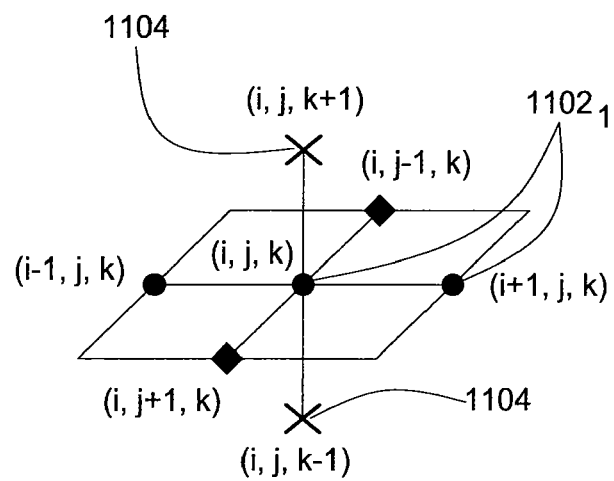
FIG. 12 is a schematic diagram illustrating the seven-point finite difference discretization at a common grid point.

FIG. 12 is a schematic diagram illustrating the seven-point finite difference discretization at a common grid point 1102 designated in FIG. 11 by the number $1102_1$, which lies on the edge of the interface 1100. The three-dimensional location of the common grid point $1102_1$ is identified by (i, j, k).

In one embodiment, the standard seven-point discretization of the heat partial differential equation of EQN. 7 at the common grid point $1102_1$ has the form:

$$(a_{i-1,j,k} + a_{i+1,j,k} + a_{i,j-1,k} + a_{i,j+1,k} + a_{i,j,k-1} + a_{i,j,k+1})T_{i,j,k} - \quad \text{(EQN. 11)}$$
$$a_{i-1,j,k}T_{i-1,j,k} - a_{i+1,j,k}T_{i+1,j,k} - a_{i,j-1,k}T_{i,j-1,k} -$$
$$a_{i,j+1,k}T_{i,j+1,k} - a_{i,j,k-1}T_{i,j,k-1} - a_{i,j,k+1}T_{i,j,k+1} = f_{i,j,k}$$

where the $a_{i,j,k}$ terms represent constants related to the grids 1000 (e.g., a grid at a given point or sequence location in a grid schedule) and the $T_{i,j,k}$ terms represent temperature points on the grids 1000.

The $a_{i,j,k}$ terms in EQN. 8 are not necessarily uniform due to the nonuniformity in the discretization step size and the thermal conductivities. To consider the material discontinuity at the common grid point $1102_1$, the equation:

$$L_n e_n = 0 \quad \text{(EQN. 12)}$$

is generally enforced, where $L_n e_n$ denotes the application of a finite difference operator to the interpolated solution correction in the fine grid (e.g., replacing the $T_{i,j,k}$ terms with $e_{i,j,k}$ terms in the left hand side of EQN. 11, where the $e_{i,j,k}$ terms represent error between iterations of the grid cycle).

Solution errors at the fine grid points 1104 that neighbor the common grid point $1102_1$ (e.g., where the neighboring fine grid points 1104 are defined by the three-dimensional locations (i,j,k−1) and (i,j,k+1)) are not yet known because interpolation has not yet been performed for these fine grid points 1104. In one embodiment, this problem is solved by averaging the solution errors along the y direction. In particular, by approximating $e_{i,j-1,k}$ and $e_{i,j+1,k}$ by $e_{i,j,k}$ in EQN. 11, an approximation of EQN. 11 is made such that:

$$(A - a_{i,j-1,k} - a_{i,j+1,k})e_{i,j,k} - a_{i-1,j,k}e_{i-1,j,k} - a_{i+1,j,k}e_{i+1,j,k} -$$
$$a_{i,j,k-1}e_{i,j,k-1} - a_{i,j,k+1}e_{i,j,k+1} = 0 \quad \text{(EQN. 13)}$$

where $$A = a_{i-1,j,k} + a_{i+1,j,k} + a_{i,j-1,k} + a_{i,j+1,k} + a_{i,j,k-1} + a_{i,j,k+1} \quad \text{(EQN. 14)}$$

Thus, the operator-dependent interpolation at the common grid point $1102_1$ is:

$$e_{i,j,k} = \frac{(a_{i-1,j,k}e_{i-1,j,k} + a_{i+1,j,k}e_{i+1,j,k} + a_{i,j,k-1}e_{i,j,k-1} + a_{i,j,k+1}e_{i,j,k+1})}{A - a_{i,j-1,k} - a_{i,j+1,k}} \quad \text{(EQN. 15)}$$

where all of the error values on the right hand side of EQN. 15 are either directly available from the coarse grid or obtained are obtained by using tri-linear interpolation. EQN. 15 may be similarly applied to perform interpolation at neighboring common grid points designated as $1102_2$, $1102_3$ and $1102_4$.

To perform interpolation at the common grid point $1102_5$, which lies in the center of the interface 1100, operator-dependent interpolation can be achieved by directly applying EQN. 12, since errors at all six other common grid points 1102 in the discretization have already been determined. Using the same notation as in EQN. 15, the interpolation for common grid point $1102_5$ is thus:

$$e_{i,j,k} = \frac{(a_{i-1,j-k}e_{i-1,j,k} + a_{i+1,j,k}e_{i+1,j,k} + a_{i,j,k-1}e_{i,j,k-1} + a_{i,j,k+1}e_{i,j,k+1} + a_{i,j,k-1}e_{i,j,k-1} + a_{i,j,k+1}e_{i,j,k+1})}{A - a_{i,j-1,k} - a_{i,j+1,k}} \quad \text{(EQN. 16)}$$

Referring back to FIG. 8, once the solution errors have been interpolated at each grid point, the method 800 proceeds to step 810 and maps the residue of the fine grid problem solution to the coarse grid in accordance with an operator-dependent restrictor. The "residue" of the fine grid problem comprises the differences between the actual and approximated values of f, i, j and k in EQN. 11. Thus, restriction is substantially the reverse of interpolation: it is performed starting with a fine grid and progresses toward coarser grids. The restricted "residue" at a coarse grid point is a weighted average of the residue values of the seven points in the corresponding finite difference discretization on the fine grid. The weight of each grid point in the restriction is taken as the absolute value of its weight in the finite difference.

Once the residue of the fine grid problem solution has been mapped to the coarse grid, the method 800 proceeds to step 810 and smoothes the solution errors in accordance with a vertical line smoother. The vertical line smoother is more effective in smoothing the errors of highly anisotropic problems.

A first source of anisotropy in the present problem is attributable to geometry as a result of finite difference discretization of the heat partial differential equation. FIGS. 13A and 13B are schematic diagrams illustrating the anisotropic nature of heat conduction in control volumes 908 of the semiconductor chip 900. Specifically, FIG. 13A illustrates the heat diffusion, depicted by arrow 1300a, between two laterally neighboring control volumes 908; FIG. 13B illustrates the heat diffusion, depicted by arrow 1300b, between two vertically stacked control volumes 908. As is apparent from FIGS. 13A and 13B, the heat diffusion between two vertically stacked control volumes 908 is significantly larger than that between two laterally neighboring control volumes 908 (as illustrated by the relative magnitudes of arrows 1300a and 1300b). This is in part because the lateral dimension (and corresponding sidewall surface area) of a control volume 908 tends to be significantly larger than the thickness (and corresponding top/bottom surface area) of the same control volume 908 (the same is also true for the semiconductor chip 900 in general). This "geometry induces" asymmetry is more pronounced in thin material layers 904 where the lateral dimension of a control volume can be comparable to the die size, while the thickness is only on the submicron scale.

A second source of anisotropy is attributable to the fact that in highly thermally conductive material layers 904, grid points tend to be more strongly coupled than they are in other, less conductive material layers 904. For instance, grid points in a metal material layer 904 tend to be more strongly coupled than grid points in an interlayer dielectric material layer 904, due to the low thermal resistance of metal.

FIG. 14 is a schematic diagram illustrating the performance of a vertical line smoother, according to the present invention. The vertical line smoother is a direct solver method that simultaneously relaxes strongly coupled grid points 1102 in all of the control volumes 908 in a vertical stack 1400 of control volumes 908. The intuition behind the vertical line smoother is as follows: the majority of heat accumulated in any control volume 908 will always find low resistive paths to diffuse. As a result, most of the heat will diffuse vertically to the control volume's neighboring control volumes above and below rather than to the control volume's laterally adjacent neighbors. In other words, control volumes 908 in vertical stacks such as the vertical stack 1400 are strongly coupled.

In one embodiment, a tridiagonal system is solved in order to relax the vertical stack 1400 of control volumes 908. The size of the tridiagonal problem is substantially equal to the number of control volumes 908 in the vertical stack 1400, which in one embodiment is less than one hundred control volumes 908 per vertical stack 1400. In one embodiment, the tridiagonal system is solved using an iterative method for solving linear systems of equations, including Gaussian elimination methods such as the known Thomas algorithm (e.g., as proposed by Llewellyn H. Thomas in "Elliptic Problems In Linear Difference Equations Over a Network", Watson Sci. Comput. Lab. Rept., Columbia University, New York, 1949).

Due to the special three-dimensions of the multiple on-chip material layers 904 and the choice of grid hierarchy (e.g., as illustrated in FIG. 10), anisotropy created by geometry is more dominant than anisotropy created by discontinuity in thermal conductivity. Thus, the adoption of the vertical line smoother, as opposed to, say, a standard Gauss-Seidel smoother, effectively enhances the robustness of the multi-grid solution method discussed herein.

Once the solution errors have been smoothed in accordance with the vertical line smoother, the method 800 terminates in step 814.

Figure 15:
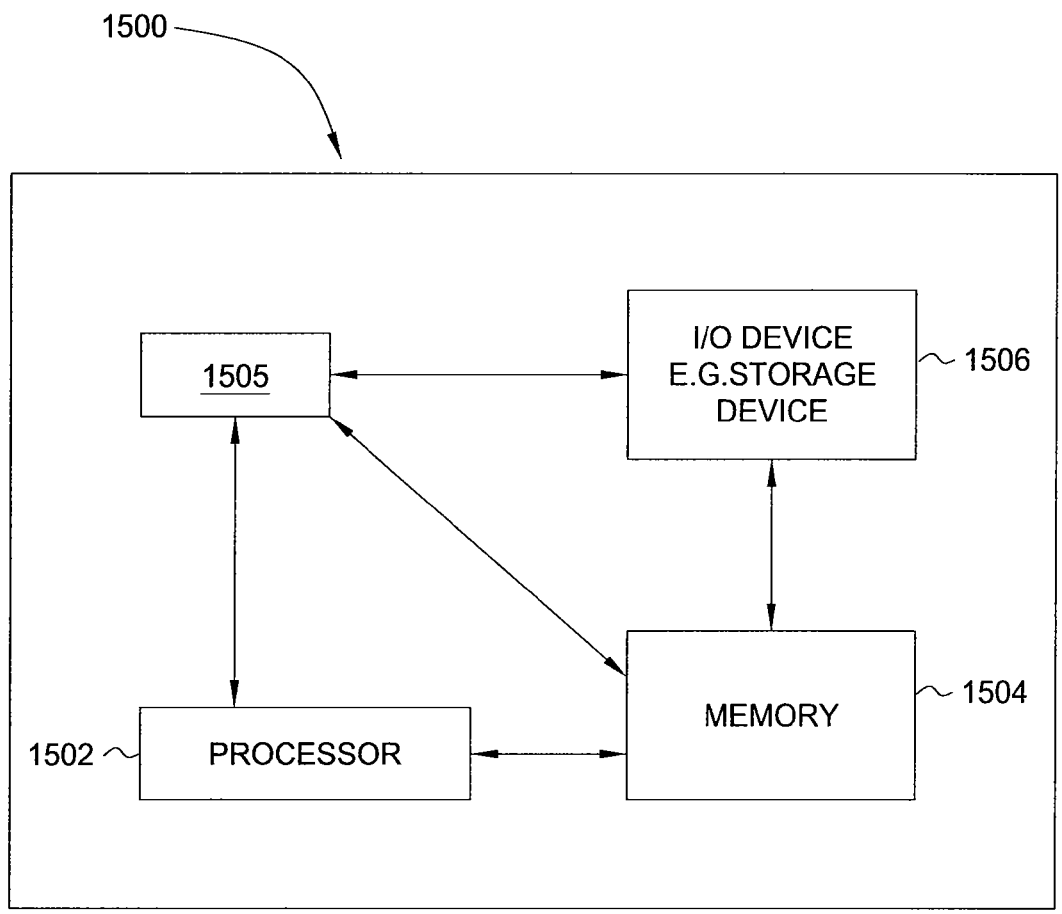
FIG. 15 is a high level block diagram of the present thermal analysis tool that is implemented using a general purpose computing device.

FIG. 15 is a high level block diagram of the present thermal analysis tool that is implemented using a general purpose computing device 1500. In one embodiment, a general purpose computing device 1500 comprises a processor 1502, a memory 1504, a thermal analysis module 1505 and various input/output (I/O) devices 1506 such as a display, a keyboard, a mouse, a modem, a network connection and the like. In one embodiment, at least one I/O device is a storage device (e.g., a disk drive, an optical disk drive, a floppy disk drive). It should be understood that the thermal analysis module 1505 can be implemented as a physical device or subsystem that is coupled to a processor through a communication channel.

Alternatively, the thermal analysis module 1505 can be represented by one or more software applications (or even a combination of software and hardware, e.g., using Application Specific Integrated Circuits (ASIC)), where the software is loaded from a storage medium (e.g., I/O devices 806) and operated by the processor 1502 in the memory 1504 of the general purpose computing device 1500. Additionally, the software may run in a distributed or partitioned fashion on two or more computing devices similar to the general purpose computing device 1500. Thus, in one embodiment, the thermal analysis module 1505 for modeling and thermal analysis of semiconductor chip designs using actual temperature data described herein with reference to the preceding figures can be stored on a computer readable medium or carrier (e.g., RAM, magnetic or optical drive or diskette, and the like).

Thus, the present invention represents a significant advancement in the field of semiconductor chip design. Embodiments of the invention generally provide a method and apparatus for thermal modeling and analysis of semiconductor chip designs. By providing temperature data that is computed or calculated based on actual chip information instead of estimated temperature data (e.g., based on an assumed uniform temperature), and modeling this temperature data in accordance with a tailored multi-grid technique, more accurate understanding of the thermal gradients produced by an operating semiconductor chip design can be attained. Moreover, the multi-grid technique described herein can be used to model the thermal gradient without building a problem matrix, and is thus quicker and less computationally intensive than existing modeling techniques using multi-grid solvers.

While the foregoing is directed to embodiments of the invention, other and further embodiments of the invention may be devised without departing from the basic scope thereof, and the scope thereof is determined by the claims that follow.

What is claimed is:

1. A method for performing thermal testing of a semiconductor chip design, the method comprising:
    calculating full-chip temperatures over said semiconductor chip design; and
    modeling said full-chip temperatures in accordance with a geometric multi-grid technique, wherein said modeling comprises:
        constructing a coarse grid operator in accordance with one or more physical attributes of said semiconductor chip design, said coarse grid operator comprising a plurality of grids representing said semiconductor chip design wherein said constructing comprises applying coarsening to said first grid in order to produce at least a second grid, said second grid comprising a second plurality of control volumes that is fewer than said first plurality of control volumes, where each of said second plurality of control volumes contains at least two of said first plurality of control volumes;
        interpolating solution errors at a plurality of grid points; and
        smoothing said solution errors,
    wherein at least one of: said calculating or said modeling is performed using a processor.

2. The method of claim 1, wherein said constructing comprises:
    constructing a first grid, said first grid comprising a first plurality of control volumes.

3. The method of claim 1, wherein at least some of said solution errors are interpolated in accordance with an operator-dependent interpolator.

4. The method of claim 1, wherein said smoothing is performed in accordance with a vertical line smoother.

5. The method of claim 1, wherein said one or more physical attributes is a geometry of said semiconductor chip design.

6. The method of claim 2, wherein said applying comprises:
    applying coarsening in three directions to a substrate of said first grid; and
    applying coarsening in two directions to one or more material layers of said first grid.

7. The method of claim 2, wherein an equivalent thermal conductivity of each of said first plurality of control volumes is determined by taking a weighted average of thermal conductivities of materials within said each of said first plurality of control volumes.

8. The method of claim 2, wherein an equivalent thermal conductivity of each of said second plurality of control volumes is determined by taking a weighted average of thermal conductivities of said at least two of said first plurality of control volumes contained therein.

9. The method of claim 2, wherein said grid points correspond to corners of said first plurality of control volumes and said second plurality of control volumes.

10. The method of claim 2, further comprising:
    mapping a solution residue of said first grid to said second grid.

11. The method of claim 10, wherein said mapping is performed in accordance with an operator-dependent restrictor.

12. The method of claim 6, wherein said three directions are the x direction, the y, direction and the z direction.

13. The method of claim 6, wherein said two directions are the x direction and the y direction.

14. A non-transitory computer readable medium containing an executable program for performing thermal testing of a semiconductor chip design, where the program performs steps of:
calculating full-chip temperatures over said semiconductor chip design; and
modeling said full-chip temperatures in accordance with a geometric multi-grid technique, wherein said modeling comprises:
constructing a coarse grid operator in accordance with one or more physical attributes of said semiconductor chip design, said coarse grid operator comprising a plurality of grids representing said semiconductor chip design wherein said constructing comprises applying coarsening to said first grid in order to produce at least a second grid, said second grid comprising a second plurality of control volumes that is fewer than said first plurality of control volumes, where each of said second plurality of control volumes contains at least two of said first plurality of control volumes;
interpolating solution errors at a plurality of grid points; and
smoothing said solution errors.

15. The non-transitory computer readable medium of claim 14, wherein said constructing comprises:
constructing a first grid, said first grid comprising a first plurality of control volumes.

16. The non-transitory computer readable medium of claim 14, wherein at least some of said solution errors are interpolated in accordance with an operator-dependent interpolator.

17. The non-transitory computer readable medium of claim 14, wherein said smoothing is performed in accordance with a vertical line smoother.

18. The non-transitory computer readable medium of claim 14, wherein said one or more physical attributes is a geometry of said semiconductor chip design.

19. The non-transitory computer readable medium of claim 15, wherein said applying comprises:
applying coarsening in three directions to a substrate of said first grid; and
applying coarsening in two directions to one or more material layers of said first grid.

20. The non-transitory computer readable medium of claim 15, wherein an equivalent thermal conductivity of each of said first plurality of control volumes is determined by taking a weighted average of thermal conductivities of materials within said each of said first plurality of control volumes.

21. The non-transitory computer readable medium of claim 15, wherein an equivalent thermal conductivity of each of said second plurality of control volumes is determined by taking a weighted average of thermal conductivities of said at least two of said first plurality of control volumes contained therein.

22. The non-transitory computer readable medium of claim 15, wherein said grid points correspond to corners of said first plurality of control volumes and said second plurality of control volumes.

23. The non-transitory computer readable medium of claim 15, further comprising:
mapping a solution residue of said first grid to said second grid.

24. The non-transitory computer readable medium of claim 23, wherein said mapping is performed in accordance with an operator-dependent restrictor.

25. The non-transitory computer readable medium of claim 19, wherein said three directions are the x direction, the y, direction and the z direction.

26. The non-transitory computer readable medium of claim 19, wherein said two directions are the x direction and the y direction.

27. Apparatus for performing thermal testing of a semiconductor chip design, the apparatus comprising:
means for calculating full-chip temperatures over said semiconductor chip design; and
means for modeling said full-chip temperatures in accordance with a geometric multi-grid technique, wherein said means for modeling comprises:
means for constructing a coarse grid operator in accordance with one or more physical attributes of said semiconductor chip design, said coarse grid operator comprising a plurality of grids representing said semiconductor chip design;
means for interpolating solution errors at a plurality of grid points; and
means for smoothing said solution errors.

* * * * *